United States Patent [19]

Fox et al.

[11] 4,434,074

[45] Feb. 28, 1984

[54] VOLUME REDUCTION AND ENCAPSULATION PROCESS FOR WATER CONTAINING LOW LEVEL RADIOACTIVE WASTE

[75] Inventors: Daniel W. Fox, Pittsfield, Mass.; George P. Miller; Marx E. Weech, both of San Jose, Calif.

[73] Assignee: General Electric Company, San Jose, Calif.

[21] Appl. No.: 250,439

[22] Filed: Apr. 2, 1981

[51] Int. Cl.[3] .......................... C09K 3/00; C09K 11/04; C21C 19/42

[52] U.S. Cl. .......................................... 252/628; 252/631

[58] Field of Search ................................ 252/628, 631

[56] References Cited

U.S. PATENT DOCUMENTS 4,077,901 3/1978 Arnold ................................ 252/628

4,123,380 10/1978 Norell ................................ 252/628

OTHER PUBLICATIONS

Chemical Rubber Company, Handbook of Chemistry and Physics, 53rd Ed., 1972–1973, p. D-34.

*Primary Examiner*—Brooks H. Hunt
*Assistant Examiner*—Catherine S. Kilby
*Attorney, Agent, or Firm*—Ivor J. James, Jr.; Samuel E. Turner; Raymond G. Simkins

[57] ABSTRACT

Solutions or slurries of waste material in water are dewatered and encapsulated within a polymer for disposal, comprising the operations of removing water therefrom with azeotropic mixture evaporation and encasing the dewatered waste residue in an organic polymer. The method and system disclosed are especially useful for the safe disposal of radioactive waste.

33 Claims, 1 Drawing Figure

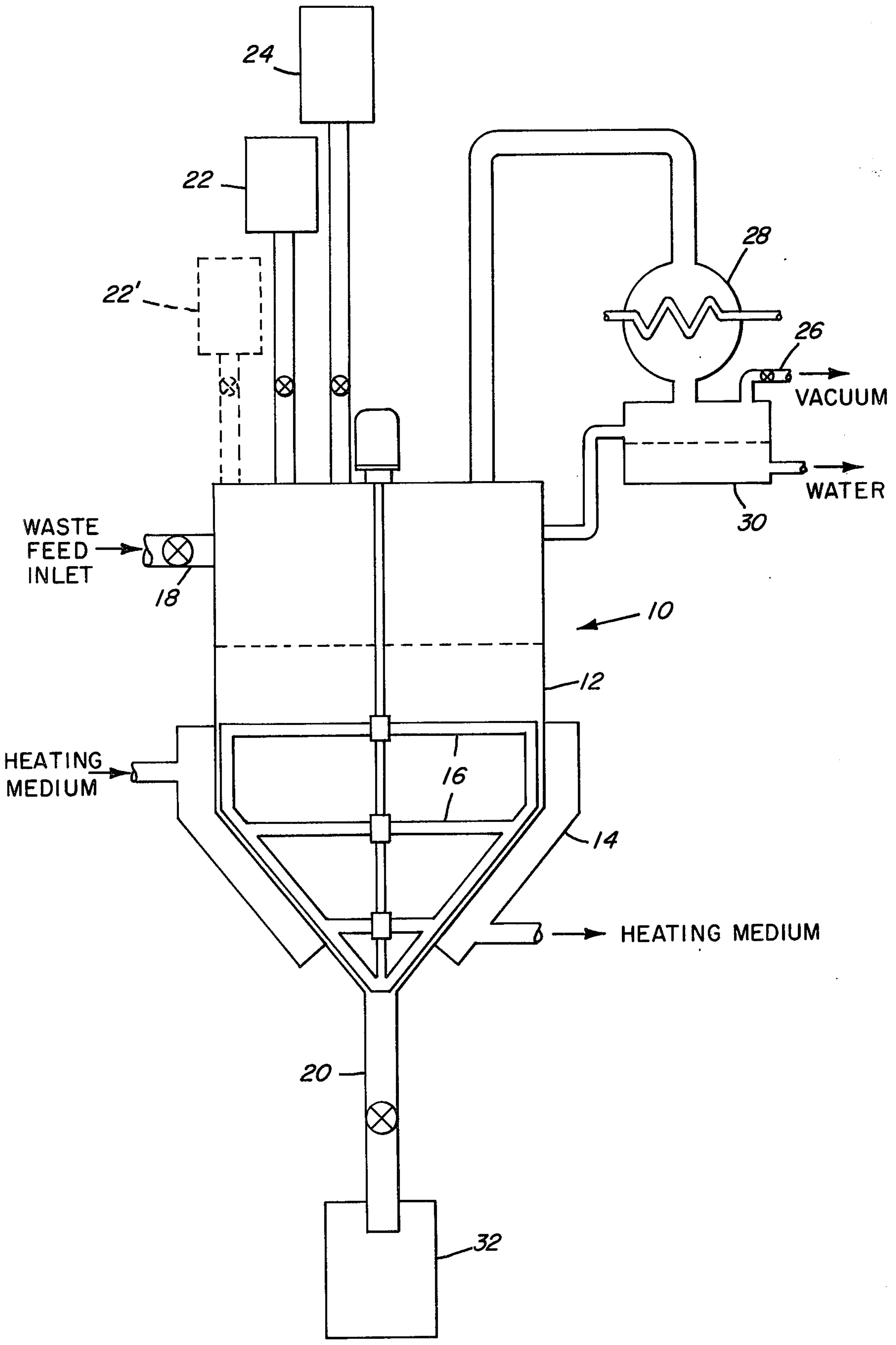
24
22
22'
28
26
VACUUM
WATER
30
WASTE
FEED
INLET
18
10
12
HEATING
MEDIUM
16
14
HEATING MEDIUM
20
32

VOLUME REDUCTION AND ENCAPSULATION PROCESS FOR WATER CONTAINING LOW LEVEL RADIOACTIVE WASTE

BACKGROUND OF THE INVENTION

This invention generally relates to the preparation of waste materials contining water as solutions or slurries for effective disposal thereof. The invention particularly relates to the disposal of water-containing radioactive waste materials from nuclear power plants, and provides for their volume reduction and safe storage or burial.

Light water moderated and cooled nuclear power plants require extensive water treatment facilities to maintain the water within prescribed radioactivity and purity levels. Corrosion products entrained within the water become activated during their passage through the reactor core and some fission products leak out of the fuel bundles into the water. The treatment processes for purifying such water produce effluents of ion exchange regeneration solutions which commonly comprise solutions of sodium sulfate, filter sludges combined with either ion exchange or other filter-aid materials, and waste ion exchange resins that are all somewhat radioactive. These wastes require encapsulation to minimize groundwater leaching and burial for final disposal.

Heretofore, these wastes have been mixed with concrete, asphalt, or urea-formaldehyde as encapsulation media. However, these processes do not provide a significant volume reduction, and indeed in the case of concrete encapsulation, the volume increases. Burial and transportation costs have escalated appreciably in recent years which make burial volume and hence waste volume reduction of paramount economic importance. Leachability of radioactive materials from the buried waste into the ground water has also become a very sensitive issue. None of the above encapsulating materials provide a low enough leach rate, over a long-term period, to avoid problems in this area.

Other disposal techniques are discussed in U.S. Pat. No. 4,077,901 where the readioactive waste solutions, or slurries, are dispersed within a polymerizable agent which forms a solid polymer about the waste for disposal. Also, U.S. Pat. No. 4,119,560 discusses dehydrating the wastes with a heated inert carrier with ultimate encapsulation of the dried waste in a polymerized epoxy for disposal.

SUMMARY OF THE INVENTION

This invention comprises a method and system for dewatering a waste stream by azeotropic distillation utilizing a non-water soluble hydrocarbon, and encapsulating the residue of the dewatered waste with an organic polymer. In the preferred embodiments of the invention, a polymerizable monomer may function as a component of the azeotropic mixture to facilitate water removal and then become part of the encapsulating polymer.

OBJECTS OF THE INVENTION

It is a primary object of this invention to provide an effective and economical means for disposing of reactor radioactive waste either of water solutions or solids.

It is also a principal object of this invention to provide a means for safely disposing of radioactive waste materials which is low in costs of both installation due to its simplicity and minimal components, and operation because of efficiency attributable to its low evaporating temperatures or energy requirements and the dual function of required additives therefor.

It is another object of this invention to provide a means for disposing of radioactive waste materials which is highly versatile and adaptable with respect to the required reactants therefor and the attributes of the encapsulating polymers compositions available for use therein.

It is a further object of this invention to provide a means for disposing of water-containing waste materials which provides for a highly effective and economical volume reduction for the water contents associated with the waste.

It is another object of this invention to produce an encapsulated radioactive waste product that has a very low degree of leachability in ground water.

It is a still further object of this invention to provide means for disposing of water-containing waste material that can handle a wide variety of water-borne wastes including toxic chemicals and radioactive materials.

BRIEF DESCRIPTION OF THE DRAWING

The drawing comprises a schematic flow sheet and diagram of the system illustrating an embodiment of this invention.

DETAILED DESCRIPTION OF THE INVENTION

The invention utilizes a principle of azeotropic drying to remove water from contaminated solutions or slurries. The distillation temperatures are always lower than the lowest boiling component of the mixture. The dewatered waste reduced in volume and preferentially wet with a polymerizable monomer is thereupon encapsulated by combining with a co-reactive polymer encasing the waste therein.

In the preferred embodiments of this invention, a polymerizing monomer such as styrene is utilized for producing the azeotropic mixture and as a co-reactant for producing the encapsulating polymer. Thus, the same liquid providing a component of the azeotropic mixture for the dewatering operation can be retained with and/or returned to the waste to produce the encapsulating polymer.

Referring to the drawing, the exemplary dewatering and encapsulating waste disposal system 10 shown therein also serves to aptly illustrate the process operations and sequence of this invention as well as a suitable means for the performance thereof.

Water-containing waste material is conducted to a vessel 12 of the system 10 for removal of water and encapsulation according to this invention. Vessel 12 is provided with a suitable heating means such as a jacket 14 for a heating medium, e.g. steam or hot water, and mixing means to combine ingredients therein such as a mixer blade 16 with a drive such as a motor. The vessel 12 includes a feed inlet 18 for receiving water-containing waste, and an outlet 20, preferably located in a lower portion thereof, for the discharge of its contents therefrom.

A water insoluble organic liquid is fed into the vessel 12 from a supply thereof such as container 22 for mixing with the water-containing waste and thereby form a low boiling temperature mixture of the organic liquid with the water.

The system can be operated with a number of organic material feeds. For example, styrene can be fed from tank 22 and this material used to form the azeotrope with water for the water removal, or materials containing styrene such as commercially available unsaturated polyesters or curable vinyl terminated esters can be added from tank 22 with the styrene component of the mixture being used to form the azeotrope with water.

The system 10 can be provided with a plurality of supply containers 22, 22', etc., for providing the vessel 12 with a supply of any one or several of azeotropic mixture and/or polymer producing agents.

The vessel 12 can also be provided as needed or appropriate with a supply, such as container 24, of any applicable polymerization governing agent comprising a polymerization inhibitor such as mono-t-butyl hydroquinone, or a polymerization catalyst or curing agent such as benzyl peroxide.

When the vessel 12 holding water containing waste is supplied with a water insoluble organic liquid, such as for example the polymerizable monomer styrene or vinyl toluene, the organic liquid is dispersed through the water to form an azeotropic mixture of a relatively low boiling temperature. Upon heating the azeotropic mixture, such as with steam in jacket 14, the low boiling temperature mixture of water and organic liquid is evaporated and the vapor mixture directed into a condenser 28 connected with the evaporating vessel 12. Evaporation of the azeotropic mixture can be encouraged and the temperature thereof lowered by reducing the atmospheric pressure within the vessel. Vessel pressure reduction means constitutes a connection to a vacuum source 26 such as a vacuum pump.

The water-organic vapor of the evaporated azeotropic mixture is cooled to a liquid within the condenser 28 and the condensate passed to a liquid phase separator 30. The two liquid phases are parted within the separator and the water phase discharged therefrom.

The water insoluble organic liquid phase is decanted from above the water phase within the separator 30 and can be cycled back into the evaporating vessel 12 for reuse, or otherwise disposed of. The separated and recycled organic liquid can be used to further the formation of an azeotropic mixture with water for an ongoing low temperature evaporation in a continuing operation, or simply returned for a subsequent batch operation.

Accordingly, the dewatering of the water-containing waste can proceed to any degree of elimination of the water content by either renewing or recycling the organic liquid for maintaining the azeotropic mixture and its evaporation.

Upon achieving a suitable degree of volume reduction through dewatering of the water-containing waste, encapsulation of the residual waste material with an organic polymer can take place.

Polymerizing agents, catalyst, additional monomers or unsaturated prepolymers can be supplied to vessel 12 by any one or combination of sources thereof and forms. Organic compositions which will polymerize through conventional reactions can be newly introduced into the vessel 12 through supply containers 22, 22', etc., for combination with the waste and its encapsulation. However, in accordance with a preferred embodiment of this invention, at least one of the ingredients of the polymerization for the encapsulation is preferably utilized whenever feasible or possible in the dewatering operation as a component of the low boiling temperature azeotropic mixture. When an organic liquid suitably fulfills the dual role of forming the azeotropic mixture with the water and an ingredient of the encapsulating polymer, it need only be cycled back into the evaporating vessel 12 from the condensor 28 and separator 30 and therein participates in the encapsulating polymer formation. Of course, a portion of the polymer producing ingredient(s) can be provided by recycling from the azeotropic mixture evaporation and a portion thereof can be newly introduced. Or one component for producing the polymer can be used to produce the azeotropic mixture and cycled back to the vessel 12 while one or more other components for the polymer can be newly introduced directly into the vessel for the encapsulation.

In any case, the polymer compositions, polymerizing reactions and polymerizing agents and the like employed in their formation, comprising monomers, catalysts and curing agents, all comprise conventional compositions, reactions and ingredients well known in the art. Note for example the polymers described in U.S. Pat. Nos. 4,077,901 and 4,119,560.

Polymers of the unsaturated polyester, curable vinyl terminated esters and epoxy classes are generally suitable for waste encapsulation and comprise preferred embodiments of this invention.

Polyesters and di-vinyl ester comprise examples of suitable polymers that may include styrene or vinyl toluene as a monomer. A typical unsaturated polyester polymer comprises a reaction product of phthalic acid, maleic acid and polyhydric alcohol. And a typical curable vinyl terminated ester comprises a bis-(acrylate ester) of a diol.

The following procedure illustrates an embodiment of the invention employing a polymer such as an unsaturated polyester or di-vinyl ester and a monomer of the type of styrene or vinyl toluene which functions as a component of the azeotropic mixture and the encapsulating polymer. Styrene is combined with a water-containing waste containing 20 weight percent of sodium sulfate to simulate an ion exchange regeneration solution effluent, in a suitable vessel heated with steam such as that shown in the drawing as 12. Styrene is added in amount of about 17 pounds per a 100 pounds of sodium sulfate salt in the waste water. The mixture is heated and maintained at its boiling point of 94° C. at atmospheric pressure and the azeotrope of water-styrene forms and evaporates in a ratio of about 59.1% styrene and about 40.9% water. The vapor is collected and condensed, and water and styrene being insoluble in one another, the two phases are separated, the water disposed of in any apt manner, and the styrene is cycled back to the waste solution or slurry within the vessel. Recycling of the styrene is continued until substantially all water is removed from the 100 pounds of sodium sulfate. At this stage the temperature will rise with the expiration of any remaining azeotropic styrene-water mixture, and the temperature increase signals the substantial elimination of the water.

Approximately 26 pounds of polyester or di-vinyl ester ingredients are added to the dewatered waste and dispersed therethrough by mixing. The ingredients of the particular polymer formulation can be introduced individually such as from the illustrated supply containers 22, 22', etc., or as a commercially available composite of the ingredients. Approximately 0.3 lbs. of catalyst, such as benzyl peroxide, is added to the other components within the vessel 12, and the combination of polymerizing agents and dewatered waste discharged into a container 32. Alternatively, the polymerization activating agent such as catalyst or curing agent can be applied after the polymer ingredients and dewatered waste have been removed from the evaporating vessel. With either procedure, the polymerization is effected with the waste within the polymerizing ingredient(s), providing a solid mass encasing the dewatered waste material within a low leaching polymer. Volume reduction from a 20% sodium sulfate solution to a solidified product ranges from four to ten fold.

Polymerization catalysts are available that become effective at a given temperature level. Thus, the catalyst can be introduced along with the other polymerizing agents in an azeotropic mixture and the dewatering by azeotropic mixture evaporation carried out below the catalyst activation temperature to forestall polymerization until after an adequate volume of water has been removed. After discharging the waste-polymer mixture into the product drum 32, the drum is heated to initiate polymerization.

Any residual catalyst in vessel 12 will not polymerize the subsequent batch since the catalyst trigger temperature will not be reached.

Commercially available composites of polymer ingredients containing styrene frequently include polymerization inhibitors to preclude the premature polymerization of the styrene. Reduced pressures can be used to carry out the dewatering evaporation at lower or more moderate temperatures compatable with the inhibited styrene containing formula, and polymerization carried out at subsequently applied higher temperature levels.

Typical epoxy-type polymer compositions, or the ingredients therefor, do not include styrene or a comparable ingredient producing an azeotropic mixture with water. Thus when using an epoxy-type polymer encapsulation, a suitable water insoluble organic liquid such as benzene, toluene, petroleum ethers, a ketone or an aldehyde is included or added to the water-containing waste at a rate or quantity suitable to produce the azeotropic mixture with the water. For example, the azeotropic boiling temperatures and composition ratios for two of said organic liquids at atmospheric pressure are as follows:

| Azeotrope | Boiling Temp. | Vapor Composition Wt. % $H_2O$ |
|---|---|---|
| Benzene-$H_2O$ | 69.3° C. | 8.9 |
| Toluene-$H_2O$ | 84.1° C. | 19.6 |

In addition to being insoluble in water to enable easy separation from water, the organic liquid for azeotropic formation must have boiling temperature substantially below the ingredients of the polymer formulation if all such components are to be included at the same time. Also, the liquid should be selected to provide a minimum boiling temperature azeotrope, and the higher the proportion of water in the azeotropic ratio the more efficient the dewatering operation.

An illustration of another embodiment of the invention utilizing an epoxy-type encapsulating polymer is as follows. A water-borne waste containing about 20 weight percent of sodium sulfate is fed into the vessel 12 containing toluene and an epoxy resin formulation of diglycidyl ether of bisphenol A (Epon 828, Shell Chemical Co.). The waste is applied until about 100 pounds of $NA_2SO_4$ has been accumulated. The temperature in the vessel is held at about 85° C. while the water-toluene azeotrope evaporates, and the toluene is returned while the water is discarded. A temperature rise indicates substantially all water removed, for a volume reduction of about 7 fold. The toluene is then evaporated at about 111° C. to remove it from the epoxy and waste, and the evaporated toluene is condensed and saved for reuse.

The residue of waste and epoxy resin is mixed to distribute the resin through the waste, a hardening agent consisting of 5 to 6 parts by weight of diethylamino propyl amine, per 100 parts by weight of the epoxy resin, is added and blended with the residue, and a cure thereof effected to encase the waste within the solidified epoxy polymer.

I claim:

1. A method of removing water from water-containing waste material and encapsulating the resultant dewatered waste material, consisting essentially of the combination of steps of:
   a. combining with water and non-volatile waste material a water insoluble polymerizable organic liquid and forming a low boiling azeotropic mixture of said polymerizable liquid with the water, and heating said azeotropic mixture to evaporate the water and polymerizable organic liquid and thereby dewater the waste material; and
   b. polymerizing said polymerizable organic liquid dispersed through the dewatered waste material, and forming a polymer encapsulation about the dewatered waste material.

2. The volume reduction and encapsulation method of claim 1, wherein the water insoluble polymerizable organic liquid comprises a polymerizable monomer.

3. The volume reduction and encapsulation method of claim 2, wherein the water insoluble polymerizable organic liquid is a liquid polyester component forming the polymer encapsulation about the dewatered waste material.

4. The volume reduction and encapsulation method of claim 2, wherein a copolymerizing agent is combined with the monomer to form the polymer encapsulation about the dewatered waste material.

5. The volume reduction and encapsulation method of claim 2, wherein a polymerizing catalyst is added to the monomer to form the polymer encapsulation about the dewatered waste material.

6. The volume reduction and encapsulation method of claim 2, wherein the polymerizable monomer comprises a monomer selected from the group consisting of styrene and vinyl toluene.

7. The volume reduction and encapsulation method of claim 1, wherein the monomer encapsulating the dewatered waste material comprises a polymer selected from the group consisting of polyesters, and epoxies.

8. The volume reduction and encapsulation method of claim 1, wherein the water insoluble polymerizable organic liquid is a polymerizable monomer, and said monomer is separated from the water of the evaporated azeotropic mixture and combined with dewatered waste material to form a polymer encapsulation about the dewatered waste material.

9. The volume reduction and encapsulation method of claim 1, wherein the waste material comprises radioactive ingredients.

10. A method of reducing the volume of water in water-containing waste material and encapsulating the resultant dewatered waste material, consisting essentially of the combination of steps of:

a. combining with water containing therein waste material a water insoluble polymerizable organic liquid and forming a low boiling temperature azeotropic mixture of said polymerizable liquid with the water, and heating said azeotropic mixture to evaporate the water and polymerizable organic liquid and thereby dewater the waste material;

b. separating the polymerizable organic liquid from the water of the evaporated azeotropic mixture; and c. polymerizing said polymerizable organic liquid dispersed through the dewatered waste material, and forming a polymer encapsulation about the dewatered waste material.

11. The volume reduction and encapsulation method of claim 10, wherein the polymerizable organic liquid separated from the water of the evaporated azeotropic mixture is recovered and combined with the waste material.

12. The volume reduction and encapsulation method of claim 10, wherein the water insoluble polymerizable organic liquid comprises a polymerizable monomer.

13. The volume reduction and encapsulation method of claim 10, wherein the water insoluble polymerizable organic liquid comprises a polymerizable monomer and when separated from the water of the evaporated azeotropic mixture said monomer is recovered and combined with the waste material for encapsulation thereof.

14. The volume reduction and encapsulation method of claim 13, wherein a copolymerizing agent is combined with the monomer to form the encapsulating polymer about the waste material.

15. The volume reduction and encapsulation method of claim 13, wherein the polymerizable monomer is styrene.

16. The volume reduction and encapsulation method of claim 13, wherein a polymerizing catalyst is added to the monomer to form the encapsulating polymer about the waste material.

17. The volume reduction and encapsulation method of claim 11, wherein the polymer encapsulating the waste material comprises a copolymer wherein one of the monomers is selected from the group consisting of unsaturated polyesters, and epoxies.

18. The volume reduction and encapsulation method of claim 13, wherein the heating of the azeotropic mixture to evaporate the water and polymerizable organic liquid thereof is at a low temperature below the boiling temperature of the water with soluble waste material therein.

19. The volume reduction and encapsulation method of claim 13, wherein the waste material comprises radioactive ingredients.

20. A method of reducing the volume of water in water-containing radioactive waste material and encapsulating the resultant dewatered radioactive waste material in a polymeric material consisting essentially of the combination of steps of:

a. combining with water containing therein radioactive waste material a water insoluble polymerizable organic liquid and forming a low boiling temperature azeotropic mixture of said polymerizable organic liquid with the water, and heating said azeotropic mixture to a low temperature of less than about 100° C. to evaporate the water and polymerizable organic liquid and thereby dewater the waste material;

b. separating the polymerizable organic liquid from the water of the evaporated azeotropic mixture and combining the separated polymerizable organic liquid with the waste material; and c. dispersing a polymerizing agent through the dewatered radioactive waste material combined with said polymerizable organic liquid, and forming a polymer encapsulation about the dewatered radioactive waste material.

21. The volume reduction and encapsulation method of claim 20, wherein the water insoluble polymerizable liquid is a polymerizable monomer and comprises the polymerizing agent.

22. The volume reduction and encapsulation method of claim 21, wherein the polymerizable monomer is styrene.

23. The volume reduction and encapsulation method of claim 21, wherein a polymerizing catalyst is added to the monomer to form the encapsulating polymer about the radioactive waste material.

24. The volume reduction and encapsulation method of claim 20, wherein the polymer encapsulating the radioactive waste material comprises a copolymer selected from the group consisting of unsaturated polyesters, and epoxies.

25. The volume reduction and encapsulation method of claim 20 wherein the polymer encapsulating the radioactive waste material comprises a polyester.

26. A method of reducing the volume of water in water-containing radioactive waste material and encapsulating the resulting dewatered radioactive waste material in a polymeric material, consisting essentially of the combination of steps of:

a. combining with water containing therein radioactive waste material a water insoluble polymerizable liquid polyester and forming a low boiling temperature azeotropic mixture of said polymerizable polyester with the water, and heating said azeotropic mixture to a low temperature of less than about 100° C. to evaporate the water and polymerizable liquid polyester and thereby dewater the waste material;

b. separating the polymerizable liquid polyester from the water of the evaporated azeotropic mixture and recovering same; and c. dispersing a catalyst for the polymerizable liquid polyester through the dewatered radioactive waste material which retains some of the combined polymerizable liquid polyester therethrough, and forming a polyester polymer encapsulation about the dewatered readioactive waste material.

27. The volume reduction and encapsulation method of claim 26, wherein at least a part of the separated and recovered polymerizable liquid polyester is recombined with the radioactive waste material for polymerization and encapsulation of the dewatered radioactive waste material.

28. The volume reduction and encapsulation method of claim 26, wherein the polymerizable liquid polyester comprises di-vinyl ester.

29. A method of reducing the volume of water in water-containing radioactive waste material and encapsulating the resulting dewatered radioactive waste material in a polymeric material, consisting essentially of the steps of:

a. combining with water containing therein radioactive waste material a water insoluble polymerizable liquid polyester and forming a low boiling temperature azeotropic mixture of said polymerizable polyester with the water, and heating said azeotropic mixture to a low temerature of less than about 100° C. to evaporate the water and polymerizable liquid polyester and thereby dewater the waste material;

b. separating the polymerizable liquid polyester from the water of the evaporated azeotropic mixture and recombining at least a part of the separated polymerizable liquid polyester with the radioactive waste material; and c. dispersing a catalyst for the polymerizable liquid polyester through the dewatered radioactive waste material containing the polymerizable liquid polyester, and forming a polyester polymer encapsulation about the dewatered radioactive waste material.

30. A method of reducing the volume of water in water-containing radioactive waste material and encapsulating the resulting dewatered radioactive waste material in a polymeric material, comprising the steps of:

a. combining with water containing therein radioactive waste material a water insoluble polymerizable liquid polyester and forming a low boiling temperature azeotropic mixture of said polymerizable polyester with the water, and heating said azeotropic mixture to a low temperature of less than about 100° C. to evaporate the water and polymerizable liquid polyester and thereby dewater the waste material;

b. separating the polymerizable liquid polyester from the water of the evaporated azeotropic mixture and recombining at least a part of the separated polymerizable liquid polyester with the radioactive waste material;

c. dispersing a catalyst for the polymerizable liquid polyester through the dewatered radioactive waste material containing the polymerizable liquid polyester, and forming a polyester polymer encapsulation about the dewatered radioactive waste material.

31. A method of removing water from water-containing waste material and encapsulating the resultant dewatered waste material, comprising the combination of steps of:

a. combining a water insoluble polymerizable liquid polyester with water containing non-volatile waste material and dispersing the insoluble liquid polyester through the water and waste material forming a low boiling azeotropic liquid mixture with the water of the waste, and heating said azeotropic liquid mixture of the combined water insoluble polymerizable liquid polyester and water to evaporate the water in the azeotropic mixture and thereby dewater the waste material;

b. separating the water insoluble polymerizable liquid polyester from the evaporated azeotropic mixture and returning same to the heating azeotropic mixture containing the non-volatile waste material to renew the azeotropic mixture and disperse through the waste material, continuing the heating until the water is removed from the waste material leaving water insoluble liquid polyester dispersed through the waste material; and c. polymerizing the water insoluble polymerizable liquid polyester dispersed through the dewatered waste material and forming a polyester encapsulation about the dewatered waste material.

32. The method of claim 31, wherein a polymerization catalyst is added to the polymerizable liquid polyester dispersed through the dewatered waste material.

33. The method of claim 31, wherein a copolymerizable monomer is added to the polymerizable liquid polyester dispersed through the dewatered waste material.

* * * * *